United States Patent [19]

Schauer

[11] 3,803,428

[45] Apr. 9, 1974

[54] ELECTRONIC TIMING STAGE

[76] Inventor: Franz Schauer, Oberensinger Strasse 13, Zizishausen, Germany

[22] Filed: Feb. 18, 1972

[21] Appl. No.: 227,363

[52] U.S. Cl. .................... 307/293, 307/313

[51] Int. Cl. .................... H03k 5/153

[58] Field of Search .................... 307/288, 293, 313

[56] References Cited

UNITED STATES PATENTS

| | | | |
|---|---|---|---|
| 3,573,564 | 4/1971 | Blauert | 307/293 X |
| 2,947,881 | 8/1960 | Elliot | 307/293 |
| 3,243,601 | 3/1966 | Higginbotham | 307/293 |

*Primary Examiner*—John Zazworsky

*Attorney, Agent, or Firm*—Michael S. Striker

[57] ABSTRACT

An electronic timing stage for timing circuitry includes a switch-current path having a current input terminal, a current output terminal and the collector-emitter path of a switch transistor having at least two conduction states. The switch-current path is closed when the switch transistor is in one of its conduction states. A control arrangement connected with the switch transistor controls the conduction state thereof. A timing arrangement connected with the control means includes a resistor and a capacitor. A switch arrangement is provided, for connecting the timing means with a source of electrical energy, thereby initiating a timing interval and causing a change of switch transistor conduction state at the end of a timing interval determined by said timing means.

7 Claims, 2 Drawing Figures

ELECTRONIC TIMING STAGE

BACKGROUND OF THE INVENTION

It is of course well known to provide electronic timing stages including RC-circuits for determining time intervals. A common disadvantage of known circuits, however, is that when they are introduced into an existing multi-stage circuit arrangement, they must be adjusted to a variety of previously established voltages at the respective connection terminals.

SUMMARY OF THE INVENTION

Thus, it is one general object of the invention to provide a timing stage for electronic circuits and the like, which is relatively independent of the considerations just stated, and certainly much more so than the majority of timing stages heretofore known and used.

It is a further object of the invention to provide a timing stage which may be incorporated into many existing electronic circuits without particular respect to variations in input potential, and thus without the necessity for additional adjusting elements.

These and other objects can be met, according to the invention, by a timing stage which includes a switch-current path. The switch-current path comprises a current input terminal, a current output terminal and the collector-emitter path of a switch transistor having at least two conduction states. The switch-current path is closed when the switch transistor is in one of its conductive states. Control means connected with the switch transistor controls the conduction state thereof. Timing means connected with the control means includes resistor means and capacitor means. Switch means applies a signal to the timing means, whereby to initiate a timing interval and cause a change of conduction state of the switch transistor at the end of a timing interval determined by said timing means.

The switching and timing action of the circuit according to the invention is largely independent of potential variations at the input terminal of the switch-current path and also of potential variations associated with the source of electrical energy for the circuit, whether such source comprises biasing batteries, or merely voltages on components of circuitry with which the timing stage is employed. The timing stage according to the invention may be used with many types of already existing circuitry, may be incorporated into the design of circuits, and can be used with great convenience.

According to one advantageous possibility, the switch transistor is of one conductivity type and has a base, and the control means includes a control transistor of opposite conductivity type, connected in circuit with the switch transistor base. In this way, the output of the control transistor, i.e., its collector current or collector-emitter voltage, at least in part determines the voltage at the switch transistor base, thereby determining the conduction state of the switch transistor.

According to a further concept of the invention, the control means has an input, and causes the switch transistor conduction state to change when the signal at the control means includes a timing capacitor connected to the switch-current path output terminal and to the control means input, the signal at the control means input varying with charging and discharging of said timing capacitor.

The timing stage of the invention can be used as a reverse-acting timing stage in which the timing capacitor determines a non-conducting intermediate interval, by suitable reversing of circuit components. In addition, this may be accomplished by positioning a third transistor between the base of the control transistor and the control means input.

Timing stages according to the invention can without difficulty be coupled with one another, by connecting the output of one timing stage with the control means input of another timing stage.

The advantageous possibility of using complementary transistors in the timing stage — i.e., npn and pnp transistors — contributes very greatly to the desired independence from voltage conditions.

Thus, it will not in general matter at what voltage level the input of the timing stage will be introduced into additional circuitry, if the timing stage is constructed according to the invention.

The source input of the stage will not be affected by voltage conditions at the input of the switch-current path, nor by the voltage conditions at the output, as will be explained below.

The timing stage, or possibly several timing stages, can all be energized from the same control voltage, whose magnitude may for example be 5 volts, without the necessity of stabilizing such voltage, because with the invention, by incorporation of an intermediate timing circuit comprising a parallel RC-circuit arranged between the base of the transistor connected with the control means input and the emitter thereof, a reliable switch-on and switch-off time-delay can be achieved, and with it a reliable insensitivity to interference voltage spikes.

For relatively sensitive control circuits, into which the timing stage can be incorporated, a resistor may advantageously be connected between the switch-current path output and the emitter of the control transistor, such emitter being advantageously maintained for instance at ground, or another suitable reference potential. This contributes to the prevention of undesired base-emitter currents such as might produce an undesired potential-shift of the operating-point of the remaining electronic circuitry. For switching relatively high currents, the timing stage can of course be provided with power transistors, controlled preferably by preliminary transistors.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
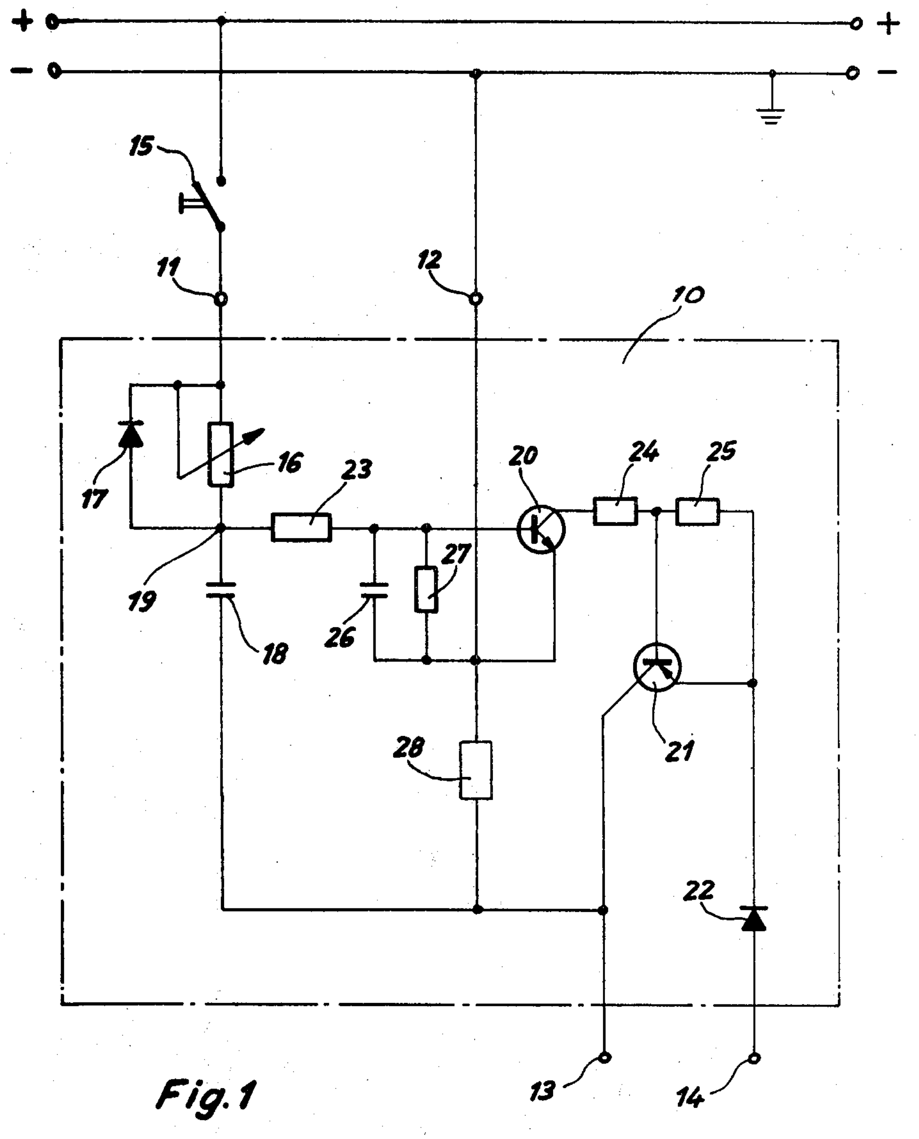
FIG. 1 is a circuit diagram of one embodiment according to the present invention.

FIG. 1 shows a timing stage according to the invention, generally designated with reference numeral 10.

The timing stage comprises a switch-current path including a current input terminal 14, a current output terminal 13, and the collector-emitter path of a switch transistor 21. In the arrangement of FIG. 1, the switch transistor 21 has at least two conduction states, preferably cut-off and saturation, and it will be appreciated that in this embodiment the switch-current path between terminals 14, 13 is closed when transistor 21 is in saturation. It should be understood from the start that it is intended in this circuit for the switch-current path to close — i.e. conduct — subsequent to closing of symbolically represented switch 15, after a time interval determined by other circuit components still to be described.

Continuing with respect to the switch-current path, it is noted that the path may include a diode 22, to establish current direction or for purposes of protection. The timing action of the timing stage is largely independent of the voltage at input terminal 14.

According to the invention, control means is provided for controlling the conduction state of switch transistor 21. In the embodiment of FIG. 1 the control means includes a control transistor 20 whose output controls the voltage at the base of switch transistor 21. In particular it will be seen that resistor 25 connects the base and emitter of transistor 21, and that resistor 24 connects the base of transistor 21 to the collector of transistor 20. The emitter of transistor 20 is connected to ground or negative-reference line 12. With this particular connection of components, it will be appreciated that the collector current of control transistor 20, passing through resistor 24, will determine the base voltage of switch transistor 21, and thereby control the conduction state of the latter.

The control means of which control transistor 20 forms a part has a control means input designated 19. The base-emitter voltage of control transistor 20 will not be of proper sign and magnitude to cause transistor 20 to conduct, unless the voltage at control means input 19 has reached a predetermined threshold value. In particular, it is noted that the base of transistor 20 is connected to the control means input by resistor 23, and that a parallel RC-circuit composed of resistance 27 and capacitor 26, shunts the base-emitter junction of the control transistor 20. Thus, when the voltage at control means input 19 reaches the threshold value, the base-emitter voltage of control transistor 20 will, by voltage division and after a charging interval dependent on the value of components 23, 26, 27, reach a forward-bias level sufficient to drive transistor 20 on, and preferably according to this embodiment into saturation.

The circuit of FIG. 1 further comprises timing means including components 16, 18 and 28. In particular, the timing means includes a timing capacitor 18 connected between control means input 19 and switch-current path output 13. In series with timing capacitor 18 there is provided a variable resistor means or adjusting means, here a shorted potentiometer 16, connected at one end to the control means input 19 and at the other end to source input 11. In addition, the timing means includes a resistor 28 in series with timing capacitor 18. Resistor 28 is connected between ground and switch-current path output 13.

The RC-network comprised of capacitor 18 and resistances 16, 28 constitutes the main timer of the timing means, in this embodiment. In particular, it will be appreciated that the signal at control means 19 will vary with charging and discharging of the timing capacitor 18, and that such charging will for the most part be characterized by the time constant associated with components 18, 16, 28.

The basic circuit connections having been described, it should be clear that the timing stage will operate as follows.

When switch 15 is open, the switch-current path between terminals 13, 14 is likewise open — i.e. nonconductive —. In particular, the signal at control means input 19 will not have reached the threshold level, so that the voltage across capacitor 26, and thus the base-emitter voltage of control transistor 20, will not permit the control transistor to conduct. Because transistor 20 is not conducting, no collector current will flow through resistors 24, 25. Because no collector current flows through resistor 25 the voltage drop across that resistor will not be of such sign and magnitude as to properly bias the base-emitter junction of transistor 21 for conduction. Accordingly, switch transistor 21 will be cut off and the current path between terminals 14, 13, as already explained, is open.

When, now, switch 15 is closed, the positive voltage level furnished by the source will be applied to source input 11. The voltage at control means input 19 will steadily rise, due to charging of capacitor 18, and will be characterized by a time constant determined for the most part, in this embodiment, by the value of components 18, 16, 28. The value of this time-constant is easily adjustable by means of variable resistor 16.

When the signal at control means input 19 has reached the threshold value, it will be possible for the control transistor 20 to conduct. In particular, with the threshold value reached, the voltage across capacitor 26, by voltage-division and after a time interval determined for the most part by the value of components 23, 26, 27, will be high enough to forward-bias the base-emitter junction of control transistor 20, and thus cause the transistor to conduct. Preferably, according to this embodiment, the transistor 20 will be driven into saturation.

As the control transistor 20 is rendered conductive, its collector current rapidly rises. This collector current flows through resistor 25 and produces, accordingly, an increasing voltage drop which, after a short time, will be sufficient to forward-bias the base-emitter junction of switch transistor 21. With its base-emitter junction properly biased, switch transistor 21 will begin to conduct; the switch-current path between terminals 14, 13 will be closed.

As switch transistor 21 begins to conduct, its collector-emitter voltage, and thus the voltage between terminals 14, 13, will rapidly drop. Inasmuch as the voltage on terminal 14 will often be fixed at some arbitrary value, it follows that the voltage on terminal 13, in such cases, will steadily increase towards the value of the input voltage. This voltage increase will make itself felt also at the capacitor 18 possibly as an overvoltage effect. Thus, at capacitor 18 the voltage will be further increased over the threshold value associated with the control voltage. This produces, through control means input 19, a hard driving of transistor 20 and thus also a quick and forceful saturation of switch transistor 21.

In this connection, it is noted that diode 17 is provided to conduct away discharge currents flowing through capacitor 18, such as might be produced as a result of the overvoltage-effect just described. The diode 17 provides a non-resistive current path for the current surge caused by such overvoltage. In this way, it is also achieved that the timing stage, having completed a switching operation, is rapidly restored to ready condition. When switch 15 is opened the forward-bias voltage on transistor 20 will terminate, so that both transistors 20 and 21 will be immediately rendered non-conductive.

Still with respect to the embodiment of FIG. 1, it has been stated already that components 23, 26, 27 of the control means are characterized by a certain overall time-constant which in part determines the conduction state of transistor 20. With regard to the FIG. 1 embodiment, however, this time-constant will usually be of secondary importance with respect to the timing action of stage 10. Instead, it is noted that RC-network 26, 27, in particular, constitutes protection means according to the invention. The damping effect associated with this RC-network will serve to protect the base-emitter junction of control transistor 20 from interference voltage spikes. At least in part because of such protection, the source voltage applied to source input 11 need not be stabilized. This, of course is a very advantageous possibility.

It is noted that the time-constant of RC-network 26, 27 may be made adjustable, if desired, and that the network may be eliminated altogether in some instances.

Figure 2:
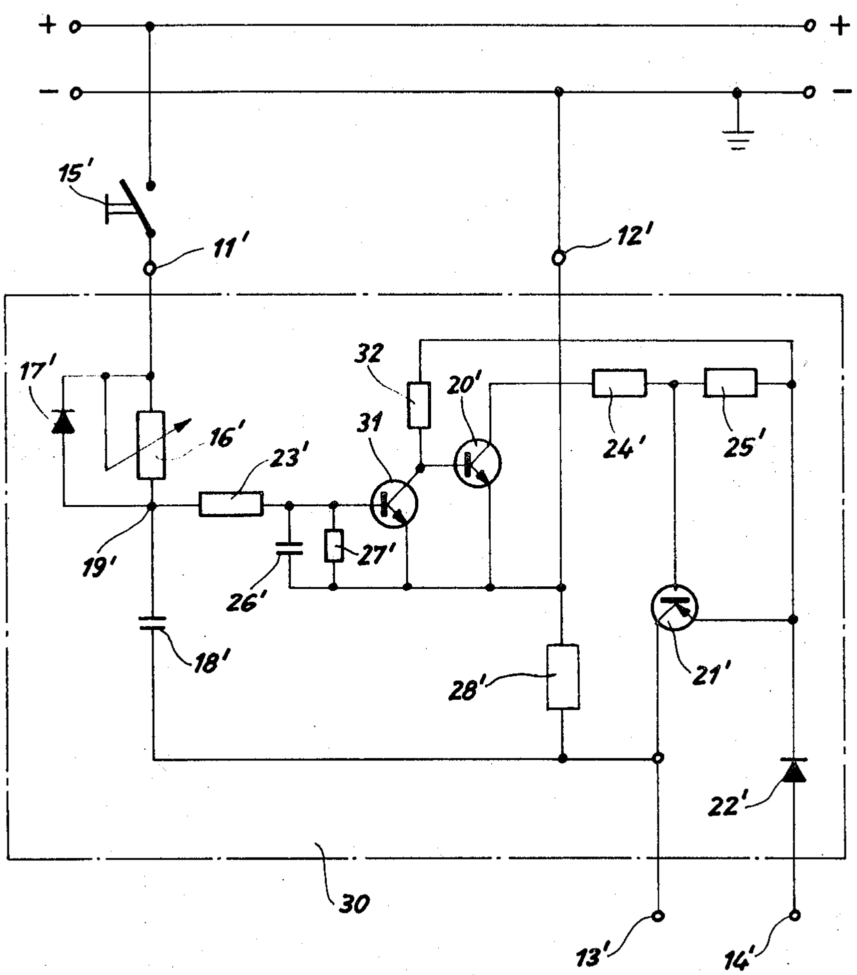
FIG. 2 is a circuit diagram of a second embodiment according to the present invention.

FIG. 2 depicts an alternative embodiment of the present invention. Components in FIG. 2 which correspond to those in FIG. 1 are indicated by the same reference numeral, primed.

The control means of FIG. 2, in addition to control transistor 20', includes a third transistor 31. The operation of the circuit in FIG. 2 is such that the switch-current path between terminals 14', 13' will ordinarily be closed — i.e., conductive—. Thus, when symbolically represented switch 15' is closed, the switch-current path will be opened—i.e., rendered non-conductive—after the elapse of a time interval characteristic of the timing stage 30.

Specifically, it is noted with respect to FIG. 2 that the base of third transistor 31 is connected to control means input 19' through resistor 23' and that RC-network 26', 27' shunts the base-emitter junction of this third transistor.

Ordinarily, the base-emitter voltage of transistor 31 will not permit conduction. The collector-emitter voltage of this third transistor will accordingly by maximum, providing a more than adequate forward-bias for control transistor 20' whose collector current flows through resistor 25', producing thereacross a voltage drop of such magnitude and sign as to forward-bias the base-emitter junction of switch transistor 21'. Thus, switch transistor 21' will conduct, and the switch-current path will be closed.

If now the symbolically represented switch 15' is closed, timing capacitor 18' will begin to charge as described with reference to FIG. 1. After a length of time for the most part determined by the time-constant associated with components 16', 18', 28', the signal at control means input 19' will reach a threshold level. The voltage across capacitor 26', by voltage-division and after a time interval determined in part by components 23', 26', 27' as well as components 16', 18', 28', will increase to such an extent as to forward-bias third transistor 31, rendering the same conductive.

Transistor 31 being conductive, its collector-emitter voltage will drop to a minimum, and the forward-bias on the base-emitter junction of control transistor 20' will terminate. Thus, control transistor 20' will be rendered non-conductive and, in the manner described before, cause switch transistor 21' to become non-conductive, opening the switch-current path.

While the embodiments of FIGS. 1 and 2 have been illustrated as composed of discrete, interconnected components, such is of course only by way of example. In fact, the inventive concept comprehends the possibility of constructing the timing stage as a single block including switch 15 or 15'. However, it is also possible to divide the timing state at control point 19 or 19' into a pure timing part including charging capacitor 18, and into a switching part including the transistor circuitry.

Use of the timing stage of the invention greatly facilitates circuit design as well as the actual construction of control circuitry. The timing stage may be produced as a widely useful block component, possibly in intergated-circuit form. The terminals of the control inputs and the current-path inputs and outputs can very readily be joined with the outputs of other circuit stages, other circuit elements or other timing stages. The timing stage of the invention can be used and installed by relatively unskilled technical personnel, since the connection necessary is directly into the current path of the circuit and practically independent of the voltage conditions prevailing at the point of insertion.

It will be understood that each of the elements described above, or two or more together, may also find a useful application in other types of constructions and circuits differing from the types described above.

While the invention has been illustrated and described as embodied in an electronic timing stage, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should are are intended to be comprehended within the meaning and range of equivalence of the following claims.

What is claimed as new and desired to be protected by Letters Patent is set forth in the appended claims:

1. An electronic timing stage built as a circuit module connectable as a whole into an existing electrical circuit without regard to the voltage level at the point of connection to such existing electrical circuit, comprising, in combination means defining a switch current path including a current input terminal and a current output terminal and including the collector-emitter path of a switch transistor and a diode connected in series with said collector-emitter path; control means for controlling the conductivity of said switch transistor and including a control transistor having an output electrode connected to the base of said switch transistor for controlling the conductivity of said switch transistor, and a resistor having one terminal connected to the base of said control transistor and another terminal constituting a control means input; timing means connected to said control means and including a timing capacitor connected between said control means input and said current output terminal, and means for charging said timing capacitor including a charging resistor connected in series with said timing capacitor; and a resistor and a capacitor connected in parallel and connected between the base and emitter of said control transistor.

2. An arrangement as defined in claim 1, wherein said timing means further includes a resistor connected between said current output terminal and a fixed reference voltage.

3. An electronic timing stage built as a circuit module connectable as a whole into an existing electrical cirucit, comprising, in combination, means defining a switch current path including a current input terminal and a current output terminal and including an electronic switch element having an output current path and having at least two conduction states, said switch current path being conductive when said electronic switch element is in one of said conduction states; control means connected with said electronic switch element for controlling the conduction state thereof; timing means connected with said control means and including resistor means and capacitor means; and switch means for applying a signal to said timing means to initiate a timing interval determined by said timing means and cause a change of conduction state of said electronic switch element at the end of such timing interval, wherein said electronic switch element is a transistor having a base, an emitter and a collector, with the collector-emitter path of said transistor constituting said output current path of said electronic switch element, said switch transistor being of one conductivity type, and wherein said control means includes a control transistor of opposite conductivity type connected in circuit with said switch transistor base, the collector-emitter current of said control transistor determining the voltage at said switch transistor base, and thereby determining the conduction state of said switch transistor, said control means having a control means input and causing said switch transistor conduction state to change when the signal at said control means input reaches a threshold value, said capacitor means including a timing capacitor connected to said switch current path output terminal and to said control means input, the signal at said control means input varying with charging and discharging of said timing capacitor, said timing means having a time constant at least in part determined by said timing capacitor, said timing capacitor charging upon switching of said switch means and causing said signal at said control means input to reach said threshold value, whereby to change the conduction state of said switch transistor, after a time interval determined by said time constant, said control transistor having a base in circuit with said control means input and being rendered conductive when the signal at said control means input reaches said threshold value, said control means further including protection means in circuit with the base and emitter of said control transistor for protecting the base-emitter junction of said control transistor from voltage spikes, said protection means comprising a parallel RC-network shunting the base-emitter junction of said control transistor.

4. A timing stage as defined in claim 3, said protection means further comprising a resistance in series with said capacitor of said network.

5. A timing stage as defined in claim 4, said switch-current path including a current-direction-establishing diode.

6. A timing stage as defined in claim 4 wherein said resistor means is a variable resistor and is connected in series with said capacitor means and further including diode means shunting said variable resistor.

7. A timing stage as defined in claim 4, said control transistor emitter being maintained at reference potential, and said timing means further including a resistor connected to said control transistor emitter and to said switch-current path output terminal.

* * * * *